(12) United States Patent
Chen

(10) Patent No.: US 11,321,403 B2
(45) Date of Patent: May 3, 2022

(54) METHOD, APPARATUS, AND COMPUTING DEVICE FOR DETERMINING HEAT DEGREES OF INFORMATION DISSEMINATION

(71) Applicant: Alibaba Group Holding Limited, Grand Cayman (KY)

(72) Inventor: Huijuan Chen, Guangzhou (CN)

(73) Assignee: GUANGZHOU UCWEB COMPUTER TECHNOLOGY CO., LTD, Guangzhou (CN)

(*) Notice: Subject to any disclaimer, the term of this patent is extended or adjusted under 35 U.S.C. 154(b) by 498 days.

(21) Appl. No.: 15/873,404

(22) Filed: Jan. 17, 2018

(65) Prior Publication Data

US 2018/0203935 A1    Jul. 19, 2018

(30) Foreign Application Priority Data

Jan. 17, 2017  (CN) .......................... 201710031028.5

(51) Int. Cl.
| | | |
|---|---|---|
| *G06F 17/18* | (2006.01) | |
| *H04L 29/08* | (2006.01) | |
| *G06F 16/9535* | (2019.01) | |
| *G06Q 10/04* | (2012.01) | |
| *G06F 17/11* | (2006.01) | |
| *H04L 67/50* | (2022.01) | |
| *G06Q 50/00* | (2012.01) | |

(52) U.S. Cl.
CPC .......... *G06F 16/9535* (2019.01); *G06F 17/11* (2013.01); *G06F 17/18* (2013.01); *G06Q 10/04* (2013.01); *H04L 67/22* (2013.01); *G06Q 50/01* (2013.01)

(58) Field of Classification Search
CPC ....... G06F 16/9535; G06F 17/11; H04L 67/22
See application file for complete search history.

(56) References Cited

U.S. PATENT DOCUMENTS

| | | | | |
|---|---|---|---|---|
| 2011/0252027 | A1* | 10/2011 | Chen ..................... | G06F 16/335 707/728 |
| 2016/0055253 | A1* | 2/2016 | Herzig ................ | G06F 16/9535 707/749 |
| 2017/0323313 | A1* | 11/2017 | Li .......................... | G06N 20/00 |

\* cited by examiner

*Primary Examiner* — Regis J Betsch
*Assistant Examiner* — Jeremy A Delozier
(74) *Attorney, Agent, or Firm* — Alston & Bird LLP

(57) ABSTRACT

The present disclosure provides a method, an apparatus, and a computing device for determining dissemination heat degree of information. The method for determining dissemination heat degree of information includes analyzing N levels of sharing data of specific network information to determine parameters related to each sharing level of the specific network information, where N is a natural number greater than 1; and calculating a dissemination heat degree S of the specific network information based on the parameters related to the sharing of the specific network information. The dissemination heat degree obtained according to the disclosed method, apparatus, and computing device can be used to predict the popular level of the specific network information during the subsequent dissemination process.

10 Claims, 3 Drawing Sheets

METHOD, APPARATUS, AND COMPUTING DEVICE FOR DETERMINING HEAT DEGREES OF INFORMATION DISSEMINATION

CROSS-REFERENCES TO RELATED APPLICATIONS

This application claims the priority of Chinese Patent Application No. CN201710031028.5, filed on Jan. 17, 2017, the entire content of which is incorporated herein by reference.

TECHNICAL FIELD

The present disclosure generally relates to the field of communication technology and, more particularly, relates to a method, an apparatus, and a computing device for determining heat degrees of information dissemination.

BACKGROUND

With the development of Internet technology, information disseminated in the network has explosively increased. The vast amount of information, including real and fake, valuable and useless, is mixed, making the truly valuable information flooded by a large amount of spam, and thus users are often confused by the complex information. Therefore, how to pick valuable information from a large amount of information disseminated on the Internet is a main issue nowadays.

The existing scheme mainly determines the heat degree of the information according to the click rate of the information. The higher the heat degree is, the more valuable the information is for the user. However, information with great click rate has been known by the majority of the users. Therefore, the scheme of determining the heat degree of information based on the click rate is a backward verification that can only be used to indicate the dissemination heat degree of the information, but cannot be used to predict the dissemination heat degree of the information at the initial stage of the dissemination of the information.

Therefore, a new scheme for determining the heat degree of information dissemination is needed.

BRIEF SUMMARY

The main objective of the present disclosure is to provide a method, an apparatus, and a computing device for determining a heat degree of information dissemination, which are capable of determining the heat degree of the dissemination of network information based on the parameters related to each sharing level during the multi-level dissemination of the network information.

According to one aspect of the present disclosure, a method for determining a heat degree of information dissemination is provided. Network information is disseminated in multiple levels by sharing. The method includes the following steps: analyzing N levels of sharing data with respect to the specific network information to determine the parameters related to each sharing level of the specific network information, where N is a natural number greater than 1; and calculating the dissemination heat degree S of the specific network information based on the parameters related to the sharing of the specific network information.

The present disclosure can obtain the parameters related to each sharing level of the specific network information during the multi-level sharing process by analyzing the N levels of the sharing data of the disseminated specific network information, such that the dissemination heat degree of the specific network information can be determined based on the parameters related to each sharing level. In addition, the dissemination heat degree obtained through calculation can also be used to predict the popular level of the specific network information during the subsequent dissemination process.

In one embodiment of the present disclosure, a $j^{th}$ level of sharing data includes a sharing time average $T_j$ and/or a sharing number $P_j$, where $j=1, \ldots, N$. The step to determine the parameters related to each sharing level of the specific network information may include a dissemination speed parameter calculation step, configured for calculating an averaged sharing time interval $T_j-T_{j-1}$ between two adjacent sharing levels and having an inverse of the averaged sharing time interval as a dissemination speed parameter $F_j$ of the $j^{th}$ sharing level, i.e., $$F_j = \frac{1}{T_j - T_{j-1}},$$

where $T_0$ represents an original release time of the specific network information, and/or a dissemination intensity parameter calculation step, configured for calculating a ratio between the sharing numbers of two adjacent sharing levels $P_{j+1}/P_j$, as a dissemination intensity parameter $H_{j+1}$ for a $(j+1)^{th}$ sharing level, i.e., $H_{j+1}=P_{j+1}/P_j$.

Therefore, the parameters related to each sharing level of the specific network information may be preferably determined based on both the dissemination speed and the dissemination intensity. As such, the dissemination heat degree obtained through calculation based on the dissemination speed and the dissemination intensity of each sharing level may be more accurate.

In one embodiment of the present disclosure, when the sharing data include a sharing time average $T_j$ and a sharing number $P_j$, the step to calculate the dissemination heat degree S of the specific network information may include one of the followings: determining a sum of the dissemination speed parameter $F_j$ for all sharing levels of the specific network information as the dissemination heat degree S of the specific network information, i.e., $S=\Sigma_{j=1}^{N}F_j$; determining a sum of the dissemination intensity parameter $H_j$ for all sharing levels of the specific network information that start from the $2^{nd}$ sharing level, as the dissemination heat degree S of the specific network information, i.e., $S=\Sigma_{j=2}^{N}H_j$; and determining a sum of the dissemination speed parameter $F_j$ for all sharing levels of the specific network information, and a sum of the dissemination intensity parameter $H_j$ for all sharing levels that start from the $2^{nd}$ sharing level, as the dissemination heat degree S of the specific network information, i.e., $S=F_1+\Sigma_{j=2}^{N}(F_j+H_j)$.

In one embodiment of the present disclosure, the step to determine the parameters related to each sharing level of the specific network information further includes setting a dissemination speed weight factor $a_j$ for the dissemination speed of the $j^{th}$ sharing level and/or setting a dissemination intensity weight factor $b_j$ for the dissemination intensity of the $j^{th}$ sharing level. Accordingly, the step to calculate the dissemination heat degree S of the specific network information includes one of the followings: determining a sum of the product of the dissemination speed parameter $F_j$ and the dissemination speed weight factor $a_j$ for all sharing levels of the specific network information as the dissemination heat degree S of the specific network information, i.e., $S=\Sigma_{j=1}^{N} a_j F_j$; determining a sum of the product of the dissemination intensity parameter $H_j$ and the dissemination intensity weight factor b for all sharing levels of the specific network information that start from the $2^{nd}$ sharing level, as the dissemination heat degree S of the specific network information, i.e., $S=\Sigma_{j=2}^{N} b_j H_j$; and determining a sum of the product of the dissemination speed parameter $F_j$ and the dissemination speed weight factor $a_j$ for all sharing levels of the specific network information, and a sum of the product of the dissemination intensity parameter $H_j$ and the dissemination intensity weight factor $b_j$ for all sharing levels that start from the $2^{nd}$ sharing level, as the dissemination heat degree S of the specific network information, i.e., $S=a_1 F_1 + \Sigma_{j=2}^{N}(a_j F_j + b_j H_j)$.

As such, it is also possible to set corresponding weight factors for the dissemination speed parameters and/or the dissemination intensity parameters at all sharing levels such that the dissemination heat degree obtained by calculation may be more accurate.

In one embodiment of the present disclosure, the dissemination speed weight factor $a_j$ and the dissemination intensity weight factor $b_j$ are determined based on one or more following factors: the influence of the sharing entities of the $j^{th}$ sharing level; the distribution characteristics of the sharing entities of the $j^{th}$ sharing level; and the sharing-time characteristics of the $j^{th}$ sharing level.

As such, setting the dissemination speed weight factor and the dissemination intensity weight factor may refer to a variety of factors.

According to another aspect of the present disclosure, an apparatus for determining a heat degree of information dissemination is provided. Network information is disseminated in multiple levels by sharing. The apparatus for determining the heat degree of information dissemination includes a sharing parameter determination unit, configured to analyze N levels of sharing data with respect to the specific network information to determine parameters related to each sharing level of the specific network information, where N is a natural number greater than 1, and a dissemination heat degree calculator, configured to calculate the dissemination heat degree S of the specific network information based on the parameters related to the sharing of the specific network information.

In one embodiment of the present disclosure, a $j^{th}$ sharing level of sharing data includes a sharing time average $T_j$ and/or a sharing number $P_j$, where j=1, ..., N. The sharing parameter determination unit may include a dissemination speed parameter calculator, configured to calculate an averaged sharing time interval $T_j - T_{j-1}$ between two adjacent sharing levels and have an inverse of the averaged sharing time interval as a dissemination speed parameter $F_j$ of the $j^{th}$ sharing level, i.e., $$F_j = \frac{1}{T_j - T_{j-1}},$$

where $T_0$ represents an original release time of the specific network information; and/or a dissemination intensity parameter calculator, configured to calculate a ratio between the sharing numbers of two adjacent sharing levels $P_{j+1}/P_j$, as a dissemination intensity parameter $H_{j+1}$ for a $(j+1)^{th}$ sharing level, i.e., $H_{j+1}=P_{j+1}/P_j$.

In one embodiment of the present disclosure, the dissemination heat degree calculator may include one of the followings: a first heat degree calculator, configured to determine a sum of the dissemination speed parameter $F_j$ for all sharing levels of the specific network information as the dissemination heat degree S of the specific network information, i.e., $S=\Sigma_{j=1}^{N} F_j$, a second heat degree calculator, configured to determine a sum of the dissemination intensity parameter $H_j$ for all sharing levels of the specific network information that start from the $2^{nd}$ sharing level, as the dissemination heat degree S of the specific network information, i.e., $S=\Sigma_{j=2}^{N} H_j$; and a third calculator, configured to determine a sum of the dissemination speed parameter $F_j$ for all sharing levels of the specific network information, and a sum of the dissemination intensity parameter $H_j$ of each sharing level that start from the $2^{nd}$ sharing level, as the dissemination heat degree S of the specific network information, i.e., $S=F_1+\Sigma_{j=2}^{N}(F_j+H_j)$.

In one embodiment of the present disclosure, the sharing parameter determination unit may further include a speed weight factor setting module configured to set a dissemination speed weight factor $a_j$ for the $j^{th}$ sharing level, and/or an intensity weight factor setting module configured to set a dissemination intensity weight factor for the $j^{th}$ sharing level. Accordingly, the first heat degree calculator is configured to determine a sum of a product of the dissemination speed parameter $F_j$ and the dissemination speed weight factor $a_j$ for all sharing levels of the specific network information as the dissemination heat degree S of the specific network information, i.e., $S=\Sigma_{j=1}^{N} a_1 F_1$; the second heat degree calculator is configured to determine a sum of a product of the dissemination intensity parameter $H_j$ and the dissemination intensity weight factor $b_j$ for all sharing levels of the specific network information that start from the $2^{nd}$ sharing level, as the dissemination heat degree S of the specific network information, i.e., $S=\Sigma_{j=2}^{N} b_j H_j$; and the third heat degree calculator, configured to determine a sum of a product of the dissemination speed parameter $F_j$ and the dissemination speed weight factor $a_j$ for all sharing levels of the specific network information, and a sum of a product of the dissemination intensity parameter $H_j$ and the dissemination intensity weight factor $b_j$ for all sharing levels that start from the $2^{nd}$ sharing level, as the dissemination heat degree S of the specific network information i.e., $S=a_1 F_1 + \Sigma_{j=2}^{N}(a_j F_j + b_j H_j)$.

In one embodiment of the present disclosure, the dissemination speed weight factor $a_j$ and the dissemination intensity weight factor $b_j$ may be determined based on one or more following factors: the influence of the sharing entities of the $j^{th}$ sharing level; the distribution characteristics of the sharing entities of the $j^{th}$ sharing level; and the sharing-time characteristics of the $j^{th}$ sharing level.

According to another aspect of the present disclosure, a computing device is provided. The computing device includes a memory, containing a stored instruction program, and one or more processors connected to the memory. To run the instruction program stored in the memory, the one or more processors are configured to execute the following operations: analyzing N levels of sharing data of specific network information to determine the parameters related to each sharing level of the specific network information, where N is a natural number greater than 1; and calculating the dissemination heat degree S of the specific network information based on the parameters related to the sharing of the specific network information.

According to the disclosed method, apparatus, and computing device, by analyzing N levels of sharing data of specific network information, the parameters related to each sharing level of the specific network information may be obtained. As such, the dissemination heat degree S of the specific network information may be determined based on the parameters related to each sharing level. In addition, the dissemination heat degree obtained through calculation may also be used to predict the popular level of the specific network information during the subsequent dissemination process.

BRIEF DESCRIPTION OF THE DRAWINGS

The above and other objects, features, and advantages of the present disclosure will become more apparent through detailed illustration of exemplary embodiments of the present disclosure with reference to the accompanying drawings. Wherever possible, the same reference numbers will be used throughout the drawings to refer to the same or like parts.

DETAILED DESCRIPTION

Detailed illustration of exemplary embodiments of the present disclosure will now be made with reference to the accompanying drawings. Although the drawings illustrate some preferred embodiments of the present disclosure, it should be understood that the present disclosure may be implemented in various forms and should not be limited to the embodiments set forth herein. Instead, these embodiments are provided so that the present disclosure will be thorough and complete, and will fully convey the scope of the disclosure to those skilled in the art.

As mentioned above, in order to predict the popular level of the information in advance during the initial stage of information dissemination, the method, the apparatus, and the system for determining the dissemination heat degree of the information according to the present disclosure can obtain the parameters related to each sharing level of specific network information during a multi-level sharing process by analyzing N levels of the sharing data of the specific network information. As such, the dissemination heat degree of the specific network information may be determined based on the parameters related to each sharing level. Further, the dissemination heat degree obtained through calculation may be used to predict the popular level of the specific network information during the subsequent dissemination process.

Figure 1:
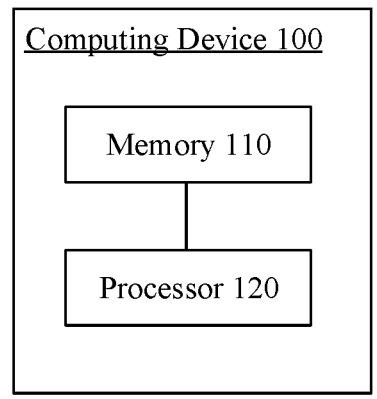
FIG. 1 illustrates a schematic functional block diagram of an exemplary computing device consistent with various embodiments of the present disclosure.

In the following, various embodiments of the present disclosure will be illustrated in detail with reference to FIGS. 1-4. FIG. 1 illustrates a schematic functional block diagram of an exemplary computing device 100 consistent with various embodiments of the present disclosure. The computing device 100 may be any type of stationary or mobile computing device, including mobile computer or mobile computing device (e.g. tablet computer, personal digital assistant, laptop computer, notebook computer, netbook, etc.), mobile phone (e.g. smartphone), wearable computing device (e.g. smart watch, smart glasses, etc.), other type of mobile device, and stationary computing device, such as desktop computer or personal computer (PC). The computing device 100 may also be a mobile or stationary server.

As shown in FIG. 1, the computing device 100 may include a memory 110 and one or more processors 120 connected to the memory 110. In one embodiment of the present disclosure, the above-described components of the computing device 100 as well as other components not shown in FIG. 1 may be connected to each other through, for example, a bus. It should be understood that the structural diagram of the computing device 100 shown in FIG. 1 is for illustrative purposes only, and not intended to limit the scope of the present disclosure. Those skilled in the art can add or replace other components as needed.

The memory 110 may store instruction program(s), and the processor 120 can execute the instruction program(s) stored in the memory 110 to calculate the dissemination heat degree S of the specific network information.

Figure 2:
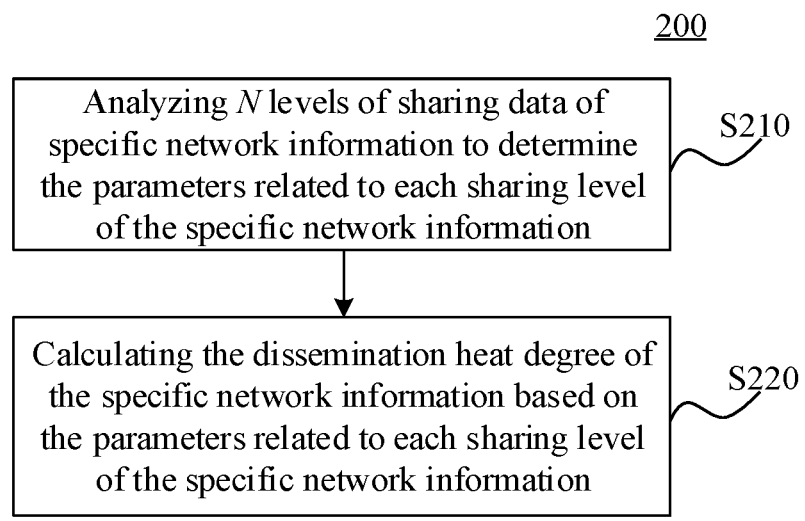
FIG. 2 illustrates a schematic flowchart of an exemplary method for determining a heat degree of information dissemination consistent with various embodiments of the present disclosure.

Specifically, the processor 120 can analyze N levels of sharing data of the specific network information to determine the parameters related to each sharing level of the specific network information, where N is a natural number greater than one. In addition, the processor 120 may calculate the dissemination heat degree S of the specific network information based on the parameters related to the sharing of the specific network information. The process for the processor 120 to calculate the dissemination heat degree of the specific network information may refer to FIG. 2. FIG. 2 illustrates a schematic flowchart of a method 200 for determining dissemination heat degree of information consistent with various embodiments of the present disclosure.

Before describing the method 200 for determining the information dissemination heat degree according to the present disclosure with reference to FIG. 2, several concepts involved in the present disclosure are briefly described below.

The network information described in the present disclosure mainly refers to information that can be disseminated in the network through multiple levels of sharing. For example, the network information may be news or self-media articles under Today's Headlines, Weibo in Sina Weibo, Say in QQ space, etc. The multi-level dissemination mentioned in the present disclosure means that the sharing entities of a latter level may share network information based on the network information shared by the sharing entities of the former level. For example, when the network information is an article under Today's Headlines, the first-level sharing entities may be one or more users A who view the article from Today's Headlines. User/users A may share the article through WeChat Circle of Friends, QQ Space, or other social platforms. The behavior that user/users A share the article through WeChat circle of friends, QQ space, or other social platforms may be regarded as the first sharing level. The behavior that one or more users B access the content of the article through the sharing provided by user/users A and then continue to share this article may be viewed as a second sharing level.

Referring to FIG. 2, the method 200 starts with step S210. In step S210, N levels of the sharing data of the specific network information are analyzed to determine the parameters related to each sharing level of the specific network information, where N is a natural number greater than one.

Each level of the sharing data of the specific network information may include a sharing time average and/or a sharing number. The sharing number may be the number of times that the network information is shared at the corresponding sharing level. For example, the sharing number can be the number of times that the network information is forwarded. The sharing time average may refer to the average time of sharing at the corresponding sharing level. That is, for each sharing level, when there are multiple sharing activities, analyzing the average time may refer to obtaining the average occurrence time for the multiple sharing activities.

Based on the sharing time averages of two adjacent sharing levels, an averaged sharing time interval $T_j-T_{j-1}$ between the two adjacent levels can be calculated. The inverse of the averaged sharing time interval may be used as a dissemination speed parameter $F_j$ for the $j^{th}$ sharing level, i.e., $$F_j = \frac{1}{T_j - T_{j-1}},$$

where j=1, N, and $T_0$ represents the original release time of the specific network information. As a result, the greater the averaged sharing time interval between the two adjacent sharing levels is, the smaller the dissemination speed parameter of the latter level of the two adjacent levels may be.

Based on the sharing numbers of two adjacent sharing levels, the ratio between the sharing numbers of the two adjacent levels, i.e. $P_{j+1}/P_j$, may be calculated as a dissemination intensity parameter $H_{j+1}$ for the $(j+1)^{th}$ sharing level, i.e. $H_{j+1}=P_{j+1}/P_j$. As a result, the greater the ratio between the sharing numbers of the two adjacent sharing levels is, the greater the dissemination intensity of the latter sharing level among the two sharing levels may be.

Therefore, after calculating the dissemination speed parameter and/or the dissemination intensity parameter for each sharing level, a step S220 may be executed. In step S220, the dissemination heat degree S of the specific network information may be calculated based on the parameters related to the sharing of the specific network information.

Specifically, a sum of the dissemination speed parameter $F_j$ for all sharing levels of the specific network information may be determined as the dissemination heat degree S of the specific network information, i.e., $S=\Sigma_{j=1}^{N}F_j$. Alternatively, a sum of the dissemination intensity parameter $H_j$ for all sharing levels of the specific network information that start from the $2^{nd}$ sharing level, may be determined as the dissemination heat degree S of the specific network information, i.e., $S=\Sigma_{j=2}^{N}H_j$. Moreover, a sum of the dissemination speed parameter $F_j$ for all sharing levels of the specific network information, and a sum of the dissemination intensity parameter $H_j$ for all sharing levels that start from the $2^{nd}$ sharing level, may be alternatively determined as the dissemination heat degree S of the specific network information, i.e., $S=+\Sigma_{j=2}^{N}(F_j+H_j)$.

As a preferred embodiment of the present disclosure, a dissemination speed weight factor and/or a dissemination intensity weight factor may also be set for each sharing level. As such, when calculating the dissemination heat degree based on the dissemination speed parameter and/or the dissemination intensity parameter, the corresponding weight factors may also be taken into account. In this case, when setting the dissemination speed weight factor and/or the dissemination intensity weight factor, the weight factors may be set according to the influence (which may be the average influence) of the sharing entities of each sharing level, the distribution characteristics of the sharing entities of each sharing level, the sharing-time characteristics of each sharing level, etc.

For example, when the sharing entities of a certain sharing level include a highly influential user or a certified user, the sharing entities of the sharing level may be considered as having high influence, and accordingly, a large dissemination speed weight factor and/or a large dissemination intensity weight factor may be set for the sharing level.

For another example, when the sharing entities of a certain sharing level are concentrated in a professional field, the dissemination heat degree of the sharing level may be considered as low, and accordingly, a small dissemination speed weight factor and/or a small large dissemination intensity weight factor may be set for the sharing level. On the contrary, when the sharing entities of a certain sharing level are distributed in many different fields, the dissemination heat degree of the sharing level may be considered as high (the whole society is concerned), and accordingly, a large dissemination speed weight factor and/or a large dissemination intensity weight factor may be set for the sharing level.

For another example, when the sharing activities of a certain sharing level are conducted during working hours such as between 9:00 am and 12:00 pm and between 2:00 pm and 6:00 pm, the dissemination heat degree of the sharing level may be considered as low, and accordingly, a low dissemination speed weight factor and/or a low dissemination intensity weight factor may be set for the sharing level.

The above shows a few examples for setting the dissemination speed weight factor and/or the dissemination intensity weight factor according to the influence of the sharing entities of each sharing level, the distribution characteristics of the sharing entities of each sharing level, the sharing-time characteristics of each sharing level, etc. It should be noted that when setting the dissemination speed weight factor and/or the dissemination intensity weight factor, the above factors may be considered together. In addition, other factors may also be considered when setting the dissemination speed weight factor and/or the dissemination intensity weight factor. For example, when the dissemination speed parameter of the $j^{th}$ sharing level is greater than the dissemination speed parameter of the $(j-1)^{th}$ sharing level, it indicates that the dissemination speed of the specific network information is accelerating. Therefore, a large dissemination speed weight factor may be set for the dissemination speed parameter of the $j^{th}$ sharing level. Similarly, when the dissemination speed parameter of the $j^{th}$ sharing level is smaller than the dissemination speed parameter of the $(j-1)^{th}$ sharing level, it indicates that the dissemination speed of the specific network information is being reduced. Therefore, a small dissemination speed weight factor may be set for the dissemination speed parameter of the $j^{th}$ sharing level. In addition, setting the dissemination intensity weight factor may be referred to this approach, which is not described herein again.

After setting the dissemination speed weight factor and/or the dissemination intensity weight factor, the dissemination heat degree of the specific network information can be calculated based on the dissemination speed parameter and/or the dissemination intensity parameter as well as the corresponding weight factors.

Specifically, a sum of the product of the dissemination speed parameter $F_j$ and the dissemination speed weight factor $a_j$ for all sharing levels of the specific network information may be determined as the dissemination heat degree S of the specific network information, i.e., $S=\Sigma_{j=1}^{N} a_j F_j$. Alternatively, a sum of the product of the dissemination intensity parameter $H_j$ and the dissemination intensity weight factor $b_j$ for all sharing levels of the specific network information that start from the $2^{nd}$ sharing level, may be determined as the dissemination heat degree S of the specific network information, i.e., $S=\Sigma_{j=2}^{N} b_j H_j$. Moreover, a sum of the product of the dissemination speed parameter $F_j$ and the dissemination speed weight factor $a_j$ for all sharing levels of the specific network information, and a sum of the product of the dissemination intensity parameter $H_j$ and the dissemination intensity weight factor $b_j$ for all sharing levels that start from the $2^{nd}$ sharing level, may be determined as the dissemination heat degree S of the specific network information, i.e., $S=a_1 F_1 + \Sigma_{j=2}^{N}(a_j F_j + b_j H_j)$.

Figure 3:
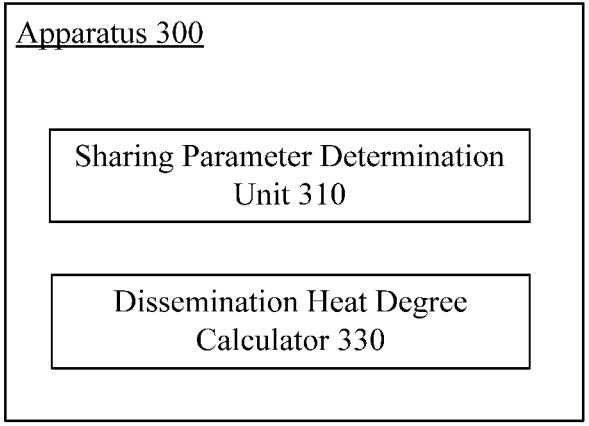
FIG. 3 illustrates a schematic functional block diagram of an exemplary apparatus for determining a heat degree of information dissemination consistent with various embodiments of the present disclosure.

FIG. 3 illustrates a schematic functional block diagram of an exemplary apparatus for determining the heat degree of information dissemination consistent with various embodiments of the present disclosure. Referring to FIG. 3, the functional modules of the apparatus for determining heat degree of information dissemination 300 may be implemented by hardware, software, or a combination of hardware and software that is configured to implement the principles of the present disclosure. Those skilled in the art may understand that the functional modules illustrated in FIG. 3 may be combined together or divided into sub-modules in order to implement the principles of the present disclosure. Therefore, the description in the present disclosure may support any possible combination or division, or further definition of the functional modules described herein.

The apparatus for determining the heat degree of information dissemination 300 shown in FIG. 3 may be configured to implement the method for determining the dissemination heat degree of information shown in FIG. 2. The following content briefly describes the functional modules that the apparatus for determining the heat degree of information dissemination 300 may have, and the operations that the functional modules can perform. For the details involved, reference may be made to the description above with reference to FIG. 2, which is not described herein again.

As shown in FIG. 3, the apparatus for determining the heat degree of information dissemination 300 may include a sharing parameter determination unit 310 and a dissemination heat degree calculator 330.

The sharing parameter determination unit 310 may be configured to analyze N levels of sharing data of specific network information to determine the parameters related to each sharing level of the specific network information, where N is a natural number greater than one.

The dissemination heat degree calculator 330 may be configured to calculate the dissemination heat degree of the specific network information based on the sharing related parameters of the specific network information.

Figure 4:
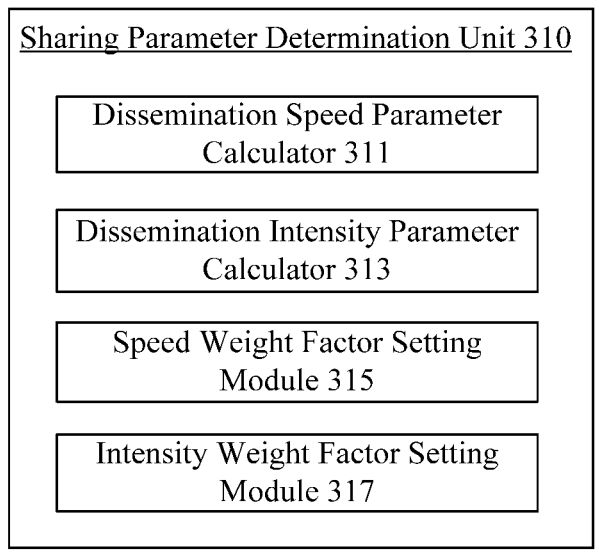
FIG. 4 illustrates a schematic diagram of functional modules in an exemplary sharing parameter determination unit consistent with various embodiments of the present disclosure.

FIG. 4 illustrates a schematic diagram of the functional modules that may be included in an exemplary sharing parameter determination unit 310 consistent with various embodiments of the present disclosure.

Referring to FIG. 4, the sharing parameter determination unit 310 may optionally include a dissemination speed parameter calculator 311 and/or a dissemination intensity parameter calculator 313.

As described above, each level of the sharing data of the specific network information may include a sharing time average and/or a sharing number. Therefore, the dissemination speed parameter calculator 311 may calculate the averaged sharing time interval $T_j - T_{j-1}$ of the two adjacent sharing levels and then have the obtained averaged sharing time interval as the determination speed parameter $F_j$ for the $j^{th}$ sharing level, i.e., $$F_j = \frac{1}{T_j - T_{j-1}},$$

where $T_0$ represents the original release time of the specific network information.

The dissemination intensity parameter calculator 313 may calculate the ratio between the sharing numbers of two adjacent sharing levels, $P_{j+1}/P_j$, and have the ratio as a dissemination intensity parameter $H_{j+1}$ for the $(j+1)^{th}$ sharing level, i.e., $H_{j+1} = P_{j+1}/P_j$.

Figure 5:
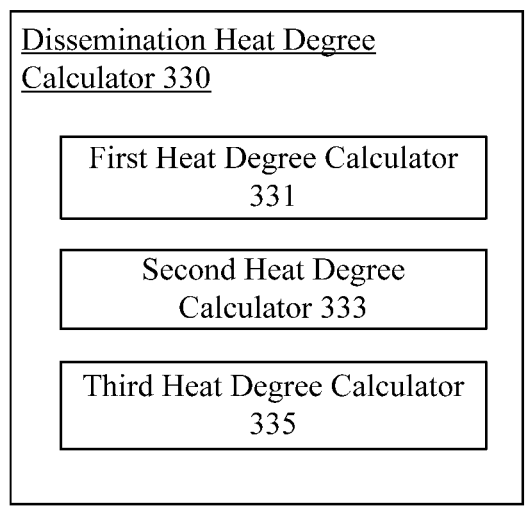
FIG. 5 illustrates a schematic diagram of functional modules in an exemplary dissemination heat degree calculator consistent with various embodiments of the present disclosure.

FIG. 5 illustrates a schematic diagram of the functional modules that may be included in an exemplary dissemination heat degree calculator 330 consistent with various embodiments of the present disclosure.

Referring to FIG. 5, the dissemination heat degree calculator 330 may optionally include a first heat degree calculator 331, a second heat degree calculator 333, or a third heat degree calculator 335.

The first heat degree calculator 331 may determine a sum of the dissemination speed parameters $F_j$ for all sharing levels of the specific network information as the dissemination heat degree S of the specific network information, i.e., $S=\Sigma_{j=1}^{N} F_j$.

The second heat degree calculator 333 may determine a sum of the dissemination intensity parameter $H_j$ for all sharing levels of the specific network information that start from the $2^{nd}$ sharing level, as the dissemination heat degree S of the specific network information, i.e., $S=\Sigma_{j=2}^{N} H_j$.

The third heat degree calculator 335 may determine a sum of the dissemination speed parameters $F_j$ for all sharing levels of the specific network information, and a sum of the dissemination intensity parameter $H_j$ for all sharing levels that start from the $2^{nd}$ sharing level, as the dissemination heat degree S of the specific network information, i.e., $S=F_1+\Sigma_{j=2}^{N}(F_j+H_j)$.

Returning to FIG. 4, the sharing parameter determination unit 310 may also optionally include a speed weight factor setting module 315 and/or an intensity weight factor setting module 317.

The speed weight factor setting module 315 may be configured to set a dissemination speed weight factor $a_j$ for the $j^{th}$ sharing level. The intensity weight factor setting module 317 may be configured to set the dissemination heat degree weight factor $b_j$ for the $j^{th}$ sharing level. The principle for setting the weight factors may refer to the description provided above, which is not described herein again.

Therefore, the first heat degree calculator 331 may alternatively determine a sum of the product of the dissemination speed parameter $F_j$ and the dissemination speed weight factor $a_j$ for all sharing levels of the specific network information as the dissemination heat degree S of the specific network information, i.e., $S=\Sigma_{j=1}^{N} a_j F_j$.

The second heat degree calculator 333 may alternatively determine a sum of the product of the dissemination intensity parameter $H_j$ and the dissemination intensity weight factor $b_1$ for all sharing levels of the specific network information that start from the $2^{nd}$ sharing level, as the dissemination heat degree S of the specific network information, i.e., $S=\Sigma_{j=2} b_j H_j$;

The third heat degree calculator 335 may alternatively determine a sum of the product of the dissemination speed parameter $F_j$ and the dissemination speed weight factor $a_j$ for all sharing levels of the specific network information, and a sum of the product of the dissemination intensity parameter $H_j$ and the dissemination intensity weight factor $b_j$ for all sharing levels that start from the $2^{nd}$ sharing level, as the dissemination heat degree S of the specific network information, i.e., $S=a_1 F_1+\Sigma_{j=2}^{N}(a_j F_j+b_j H_j)$.

The method, the apparatus, and the computing device for determining the heat degree of information dissemination according to the present disclosure have been described in detail above with reference to the accompanying drawings. In conclusion, by analyzing multiple levels of sharing data of specific network information, the present disclosure can determine the parameters related to each sharing level of the specific network information such that a dissemination heat degree of the specific network information can be calculated. Moreover, the dissemination heat degree obtained through calculation can also be used to predict the popular level of the specific network information.

In addition, the method according to the present disclosure can also be implemented as a computer program. The computer program may include computer program code instructions to carry out the steps defined in the method described above. Alternatively, the method according to the present disclosure may also be implemented as a computer program product. The computer program product may include a computer-readable medium storing a computer program for performing the functions defined in the method described above. Those skilled in the art shall also understand that the various illustrative logical blocks, modules, circuits, and algorithm steps described in connection with the disclosure herein may be implemented as electronic hardware, computer software, or a combination of both.

The flowcharts and block diagrams in the figures illustrate the architecture, functionality, and operation of possible implementations of the systems and the methods in accordance with various embodiments of the present disclosure. In this regard, each block of the flowchart illustrations or block diagrams may represent a module, a section of a program, or a portion of a code. Such a module, a section of a program, or a portion of a code may include one or more executable instructions for implementing specified logic functions. It should also be noted that in some alternative implementations, the functions labeled in the blocks may occur in an order other than the one labeled in the drawings. For example, two consecutive blocks may in fact be executed substantially in parallel, and sometimes they may be executed in the reverse order, depending on the functions involved. It is also to be noted that each block of the block diagrams and/or flowchart illustrations, and combinations of blocks in the block diagrams and/or flowchart illustration, may be implemented by special purpose hardware-based systems that perform the specified functions or operations, or may be implemented using a combination of dedicated hardware and computer instructions.

The various embodiments of the present disclosure have been described above. The above description is exemplary, not exhaustive, and is not intended to be limited to the disclosed embodiments. Many modifications and variations will be apparent to those skilled in the art without departing from the scope and spirit of the illustrated embodiments. The terminology used herein was chosen to best explain the principles of the embodiments, the practical applications, or the improvements to the techniques in the market, or to enable others of ordinary skill in the art to understand the embodiments disclosed herein.

What is claimed is:

1. A method for determining dissemination heat degree of network information, comprising:
analyzing, by a processor, N levels of sharing data during N levels of sharing of specific network information during an information dissemination process that distributes the specific network information via a network, to determine parameters related to each sharing level of the specific network information, wherein:
N is a natural number greater than 1, and
the specific network information is disseminated during the N levels of sharing of the specific network information;
based on the parameters related to each sharing level of the specific network information, calculating, by the processor, a dissemination heat degree S of the specific network information;
predicting, by the processor, a sharing level of the specific network information for a subsequent information dissemination process associated with the network based on the dissemination heat degree S of the specific network information; and
facilitating, by the processor, the subsequent information dissemination process that further distributes the specific network information via the network based on the predicted sharing level of the specific network information.

2. The method according to claim 1, wherein:
a $j^{th}$ level of the sharing data includes a sharing time average $T_j$ and a sharing number $P_j$, where $j=1, \ldots, N$, and
wherein determining the parameters related to each sharing level of the specific network information includes:
a dissemination speed parameter calculation step, configured for calculating an averaged sharing time interval $T_j-T_{j-1}$ between two adjacent sharing levels and having an inverse of the averaged sharing time interval as a dissemination speed parameter $F_j$ of the $j^{th}$ sharing level, $$F_j = \frac{1}{T_j - T_{j-1}},$$

where $T_0$ represents an original release time of the specific network information; and
a dissemination intensity parameter calculation step, configured for calculating a ratio between the sharing numbers of two adjacent sharing levels $P_{j+1}/P_j$, as a dissemination intensity parameter $H_{j+1}$ for a $(j+1)^{th}$ sharing level, $H_{j+1}=P_{j+1}/P_j$.

3. The method according to claim 2, wherein when the $j^{th}$ level of the sharing data includes the sharing time average value $T_j$ and the sharing number $P_j$, calculating the dissemination heat degree S of the specific network information includes:
determining a sum of the dissemination speed parameter $F_j$ for all sharing levels of the specific network information and a sum of the dissemination intensity parameter $H_j$ for all sharing levels that start from a $2^{nd}$ sharing level, as the dissemination heat degree S of the specific network information, $S=F_1+\Sigma_{j=2}^{N}(F_j+H_j)$.

4. The method according to claim 3,
wherein determining the parameters related to each sharing level of the specific network information further includes:
setting a dissemination speed weight factor $a_j$ for the $j^{th}$ sharing level; and/or
setting a dissemination intensity weight factor $b_j$ for the $j^{th}$ sharing level,
wherein, calculating the dissemination heat degree S of the specific network information further includes:
determining a sum of a product of the dissemination speed parameter $F_j$ and the dissemination speed weight factor $a_j$ for all sharing levels of the specific network information, and a sum of a product of the dissemination intensity parameter $H_j$ and the dissemination intensity weight factor $b_j$ of each sharing level that start from the $2^{nd}$ sharing level, as the dissemination heat degree S of the specific network information, $S=a_1F_1+\Sigma_{j=2}^{N}(a_jF_j+b_jH_j)$.

5. The method according to claim 4, wherein the dissemination speed weight factor $a_j$ and the dissemination intensity weight factor $b_j$ are set according to one or more of following factors:
influence of sharing entities of the $j^{th}$ sharing level;
distribution characteristics of sharing entities of the $j^{th}$ sharing level; and
sharing-time characteristics of the $j^{th}$ sharing level.

6. A computing device, comprising:
a memory, for storing instruction programs; and
one or more processors, connected to the memory and, when executing the instruction programs stored in the memory, configured for:
analyzing N levels of sharing data during N levels of sharing of specific network information during an information dissemination process that distributes the specific network information via a network, to determine parameters related to each sharing level of the specific network information, wherein N is a natural number greater than 1;
calculating a dissemination heat degree S of the specific network information based on the parameters related to each sharing level of the specific network information;
predicting a sharing level of the specific network information for a subsequent information dissemination process associated with the network based on the dissemination heat degree S of the specific network information; and
facilitating the subsequent information dissemination process that further distributes the specific network information via the network based on the predicted sharing level of the specific network information.

7. The device according to claim 6, wherein:
a $j^{th}$ level of the sharing data includes a sharing time average $T_j$ and a sharing number $P_j$, where $j=1, \ldots, N$, and wherein determining the parameters related to each sharing level of the specific network information includes:
a dissemination speed parameter calculation step, configured for calculating an averaged sharing time interval $T_j-T_{j-1}$ between two adjacent sharing levels and having an inverse of the averaged sharing time interval as a dissemination speed parameter $F_j$ of the $j^{th}$ snaring level, $$F_j = \frac{1}{T_j - T_{j-1}},$$

where $T_0$ represents an original release time of the specific network information; and
a dissemination intensity parameter calculation step, configured for calculating a ratio between the sharing numbers of two adjacent sharing levels $P_{j+1}/P_j$, as a dissemination intensity parameter $H_{j+1}$ for a $(j+1)^{th}$ sharing level, $H_{j+1} = P_{j+1}/P_j$.

8. The device according to claim 7, wherein when the $j^{th}$ level of the sharing data includes the sharing time average value $T_j$ and the sharing number $P_j$, calculating the dissemination heat degree S of the specific network information includes:
determining a sum of the dissemination speed parameter $F_j$ for all sharing levels of the specific network information and a sum of the dissemination intensity parameter $H_j$ for all sharing levels that start from a $2^{nd}$ sharing level, as the dissemination heat degree S of the specific network information, $S=F_1+\Sigma_{j=2}^{N}(F_j+H_j)$.

9. The device according to claim 8,
wherein determining the parameters related to each sharing level of the specific network information further includes:
setting a dissemination speed weight factor $a_j$ for the $j^{th}$ sharing level; and/or
setting a dissemination intensity weight factor $b_j$ for the $j^{th}$ sharing level,
wherein, calculating the dissemination heat degree S of the specific network information further includes:
determining a sum of a product of the dissemination speed parameter $F_j$ and the dissemination speed weight factor $a_j$ for all sharing levels of the specific network information, and a sum of a product of the dissemination intensity parameter $H_j$ and the dissemination intensity weight factor $b_j$ of each sharing level that start from the $2^{nd}$ sharing level, as the dissemination heat degree S of the specific network information, $S=a_1F_1+\Sigma_{j=2}^{N}(a_jF_j+b_jH_j)$.

10. The device according to claim 9, wherein the dissemination speed weight factor $a_j$ and the dissemination intensity weight factor $b_j$ are set according to one or more of following factors:
influence of sharing entities of the $j^{th}$ sharing level;
distribution characteristics of sharing entities of the $j^{th}$ sharing level; and
sharing-time characteristics of the $j^{th}$ sharing level.

* * * * *

UNITED STATES PATENT AND TRADEMARK OFFICE
CERTIFICATE OF CORRECTION

| | |
|---|---|
| PATENT NO. | : 11,321,403 B2 |
| APPLICATION NO. | : 15/873404 |
| DATED | : May 3, 2022 |
| INVENTOR(S) | : Huijuan Chen |

It is certified that error appears in the above-identified patent and that said Letters Patent is hereby corrected as shown below:

On the Title Page

Item (73) Assignee: "GUANGZHOU UCWEB COMPUTER TECHNOLOGY CO., LTD, Guangzhou (CN)" should read --ALIBABA GROUP HOLDING LIMITED, Grand Cayman (KY)--

Signed and Sealed this
Twentieth Day of December, 2022

Katherine Kelly Vidal
*Director of the United States Patent and Trademark Office*